United States Patent
Rajpathak et al.

(10) Patent No.: US 11,868,715 B2
(45) Date of Patent: Jan. 9, 2024

(54) DEEP LEARNING BASED AUTOMATIC ONTOLOGY EXTRACTION TO DETECT NEW DOMAIN KNOWLEDGE

(71) Applicant: GM GLOBAL TECHNOLOGY OPERATIONS LLC, Detroit, MI (US)

(72) Inventors: Dnyanesh G. Rajpathak, Troy, MI (US); Ravi S. Sambangi, Rochester Hills, MI (US); Xinli Wang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 441 days.

(21) Appl. No.: 17/140,360

(22) Filed: Jan. 4, 2021

(65) Prior Publication Data

US 2022/0215167 A1 Jul. 7, 2022

(51) Int. Cl.
*G06F 40/20* (2020.01)
*G06F 17/18* (2006.01)
*G06N 3/047* (2023.01)

(52) U.S. Cl.
CPC ............. *G06F 40/20* (2020.01); *G06F 17/18* (2013.01); *G06N 3/047* (2023.01)

(58) Field of Classification Search
None
See application file for complete search history.

(56) References Cited

U.S. PATENT DOCUMENTS

2018/0060302 A1\* 3/2018 Liang ................. G06F 16/35
2019/0130028 A1\* 5/2019 Rajpathak ........... G06Q 10/20

\* cited by examiner

*Primary Examiner* — Quynh H Nguyen (57) ABSTRACT

A system processes unstructured data to identify a plurality of subsets of text in a set of text in the unstructured data and determines, for a subset from the plurality of subsets, probabilities based on a position of the subset in the set of text, a part of speech (POS) of each word in the subset, and POSs of one or more words on left and right hand sides of the subset, a number of the one or more words being selected based on a length of the set of text. The system generates a feature vector for the subset, the feature vector including the probabilities and additional features of the subset; and classifies, using a classifier, the subset into one of a plurality of classes based on the feature vector for the subset, the plurality of classes representing an ontology of a domain of knowledge.

20 Claims, 4 Drawing Sheets

DEEP LEARNING BASED AUTOMATIC ONTOLOGY EXTRACTION TO DETECT NEW DOMAIN KNOWLEDGE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to natural language processing and more particularly to transfer learning based deep learning based automatic ontology extraction to detect new domain knowledge.

Word2vec (w2v) is a natural language processing technique that uses a neural network model to learn word associations from a large corpus of text. A trained model can detect synonymous words or suggest additional words for a partial sentence. w2v represents each distinct word with a vector. The vectors are selected such that a mathematical function can indicate a level of semantic similarity between the words represented by the vectors. w2v accepts a large corpus of text as input and produces a multidimensional vector space. Each unique word in the corpus is assigned a corresponding vector in the vector space. Word vectors are positioned in the vector space such that words that share common contexts in the corpus are located close to one another in the vector space.

SUMMARY

A system comprises a processor and a memory storing instructions which when executed by the processor configure the processor to process unstructured data to identify a plurality of subsets of text in a set of text in the unstructured data. The instructions configured to processor to determine, for a subset from the plurality of subsets, probabilities based on a position of the subset in the set of text, a part of speech (POS) of each word in the subset, and POSs of one or more words on left and right hand sides of the subset, a number of the one or more words being selected based on a length of the set of text. The instructions configured to processor to generate a feature vector for the subset, the feature vector including the probabilities and additional features of the subset. The instructions configured to processor to classify, using a classifier, the subset into one of a plurality of classes based on the feature vector for the subset, the plurality of classes representing an ontology of a domain of knowledge.

In other features, the processor is configured to train a model using manually labeled first set of feature vectors generated from the unstructured data, and to automatically label second set of feature vectors generated from the unstructured data using the trained model. The second set of feature vectors is larger than the first set of feature vectors by one or more orders of magnitude.

In other features, the classifier includes a transfer learning based classifier. The processor is configured to train the transfer learning based classifier using the larger automatically labeled second set of vectors to train low level layers of the transfer learning based classifier and then utilizing the manually labeled first set of feature vectors having a higher quality but smaller quantity than the larger automatically labeled second set of vectors to retrain top level layers of the transfer learning based classifier to improve an F1 score of the transfer learning based classifier with which to classify feature vectors representing additional unstructured data into the plurality of classes.

In another feature, the model includes a random forest based model and wherein the classifier includes a transfer learning based deep neural network.

In other features, the probabilities include Bayes' probabilities of finding the subset at a predetermined position in sets of text of a predetermined length in the unstructured data with the POSs of the one or more words on the left- and right-hand sides of the subset.

In other features, the additional features of the feature vector include start and stop positions of the subset in the set of text, the length of the set of text, and word2vec for each word in the subset.

In other features, the processor is configured to determine the length of the set of text, and to assign POSs to each word in the set of text.

In other features, the processing of the unstructured data includes cleaning the unstructured data by one or more of removing extra spaces, adding spaces between words, splitting incorrectly joined words, joining incorrectly split words, and correcting spelling.

In other features, the unstructured data includes vehicle service reports received from dealerships, and the plurality of classes includes parts, symptoms, actions, and other non-technical data.

In other features, the processor is configured to process portions of data classified by the classifier, and to assess, based on the processing of the portions of data classified by the classifier, quality of at least one of manufacturing vehicles, servicing vehicles, and parts used in vehicles.

In still other features, a method comprises processing unstructured data to identify a plurality of subsets of text in a set of text in the unstructured data. The method comprises determining, for a subset from the plurality of subsets, probabilities based on a position of the subset in the set of text, a part of speech (POS) of each word in the subset, and POSs of one or more words on left and right hand sides of the subset, a number of the one or more words being selected based on a length of the set of text. The method comprises generating a feature vector for the subset, the feature vector including the probabilities and additional features of the subset. The method comprises classifying, using a classifier, the subset into one of a plurality of classes based on the feature vector for the subset, the plurality of classes representing an ontology of a domain of knowledge.

In other features, the method further comprises training a model using manually labeled first set of feature vectors generated from the unstructured data, and automatically labeling second set of feature vectors generated from the unstructured data using the trained model. The second set of feature vectors is larger than the first set of feature vectors by one or more orders of magnitude.

In other features, the method further comprises training the classifier using the automatically labeled second set of vectors to initially train low level layers of the classifier and then utilizing the manually labelled first set of feature vectors having a higher quality than the automatically labeled second set of feature vectors to train high level layers of the classifier to classify feature vectors representing additional unstructured data into the plurality of classes.

In another feature, the model includes a random forest based model and wherein the classifier includes a deep neural network.

In other features, the probabilities include Bayes' probabilities of finding the subset at a predetermined position in sets of text of a predetermined length in the unstructured data with the POSs of the one or more words on the left and right hand sides of the subset.

In other features, the additional features of the feature vector include start and stop positions of the subset in the set of text, the length of the set of text, and word2vec for each word in the subset.

In other features, the method further comprises determining the length of the set of text, and assigning POSs to each word in the set of text.

In other features, the processing of the unstructured data includes cleaning the unstructured data by one or more of removing extra spaces, adding spaces between words, splitting incorrectly joined words, joining incorrectly split words, and correcting spelling.

In other features, the unstructured data includes vehicle service reports received from dealerships, and the plurality of classes includes parts, symptoms, actions, and other non-technical data.

In other features, the method further comprises processing portions of data classified by the classifier; and assessing, based on the processing of the portions of data classified by the classifier, quality of at least one of manufacturing vehicles, servicing vehicles, and parts used in vehicles.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A novel encoding scheme is proposed to train a transfer learning based deep learning model. The encoding includes various elements, such as part of speech based on distributional Bayesian probability model, Word2vec (w2v), position of technical terms within a document, length of verbatim, term frequency, inverse document frequency of term, and part of speech. In particular, the part of speech based on distributional Bayesian probability model is constructed based on the part of speeches related to critical technical terms and their positions within verbatim of specific lengths, which captures adaptive context information of technical terms. The Bayesian probability of part of speech related to technical terms at a specific position in verbatim of specific length are converted into a vector. This vector is used as one of the elements of the novel encoding scheme.

Ontology is a set of concepts, their instances, and categories in a subject area or domain that shows their properties and relationships between them. Ontology learning (which is an unsolved research problem particularly within automotive industry) involves identifying and extracting concepts captured in text data and classifying them into specific classes. In industries such as vehicle manufacturing, such concepts can be used to perform various tasks (e.g., emerging safety issue identification, quality control, supply chain, and diagnosis and prognosis). The present disclosure provides a natural language processing (NLP) system comprising data encoding and a transfer learning based deep learning model that uses context information, position features (e.g., start and end positions, relative position, and length of verbatim), syntactic information, and a novel distributional probability model based on parts of speech to extract and classify new concepts from unstructured text data (e.g., to extract and classify ngrams into their specific classes, such as parts, symptoms, and actions from warranty/service data of vehicles). The model significantly improves the accuracy of term extraction over traditional machine learning models.

Automatic ontology extraction model and the extracted concepts can provide a domain model for supporting semantics for different text algorithms in manufacturing industries. Newly discovered parts, symptoms, and actions can provide a better coverage to detect faults in terms of construction of new fault signatures. The system overcomes the limitations of manual curation of ontology, which is not only time consuming but impractical due to the scale of data (e.g., warranty/service data collected from vehicle dealerships around the world).

In the system of the present disclosure, data collected from various sources is encoded by combining context, position, and syntactic information that allows the data to be transformed into a hyper-dimensional vector space. While a word2vec model provides static context vectors built from surface level words (i.e., actual words or phrases, e.g., engine control module), the word2vec model fails to take into account different positions of such words in different verbatims of different lengths while constructing its surrounding information. More importantly, w2v model builds context vector by using actual words, e.g., engine control module, but if the words present in the data are not observed in the historical data then the w2v model ends up constructing an empty vector. This greatly limits an ability of build vectorized representation from data related to a new technology space, e.g., electrical and autonomous vehicles. The system also employs a random forest model to automatically and accurately perform industrial scale data labelling.

Typically, the word2vec (w2v) model provides a corpus level vectorization for each word or phrase. However, the w2v model provides an identical vector for a phrase irrespective of its occurrence at different positions in a different verbatim throughout the corpus. Also, the w2v model heavily relies on surface phrases (e.g., vehicle) to construct a vector. Instead, vectorization in the system of the present disclosure uses part of speech (POS) assigned to a phrase and then calculates its probability conditioned on part of speeches of surround phrases along with its position in different verbatims of different lengths. The system also extends the w2v model by transforming it into POS2vec. This vector is combined along with w2v as one of the encoders for the phrase.

Typically, supervised classifiers in an industrial setup exhibit limited applicability due to availability of limited amount of labeled data. In the system of the present disclosure, a Random Forest model is trained on a small quantity of high quality, manually labeled data. The trained model is then used for correcting labeling errors and then employed to automatically label large quantities of data. The trained model is not only accurate but also saves enormous amount of time and effort that would be otherwise expended in manually labelling large volumes of data from numerous sources in an industrial setup.

Specifically, the system of the present disclosure extracts and classifies business critical technical phrases, for example, in the vehicle warranty context, Part, Symptom, and Action (i.e., type of repair or service) from unstructured warranty text data by using data encoding and a deep learning model. New extracted terms can be used to construct new fault signatures, which in turn can provide higher coverage for fault detection.

The system improves the technical field of natural language processing generally and solves the problems associated with ontology extraction particularly by overcoming the above limitations of the word2vec model. The system extends the word2vec model by accommodating the context information at a corpus level. The system constructs a dynamic context vector by utilizing parts of speeches of surrounding terms and position information. The dynamic context vector provides more comprehensive context information than w2v. A distribution probability model provides adaptive context, in which parts of speeches of phrases based on their positions in different verbatim, along with parts of speeches of surrounding terms, are used. The distribution probability model estimates the probability dynamically across entire corpus, which takes into account changes in context of a specific term. These and other features of the system of the present disclosure are described below in detail.

Many vehicle manufacturers manufacture and sell vehicles internationally. Dealerships around the world prepare service reports whenever vehicles are serviced. These reports typically include short unstructured text including customer complaints, fault analyses performed, and parts identified as being defective and replaced. The manufacturers typically maintain centralized databases of these reports. The content and form of the text in these reports can vary widely. For example, the text is not only free-form (i.e., not standardized) but may be detailed or abbreviated, may contain local terminology, abbreviations, etc. The volume of the data is enormous.

Certain information, such as part, symptom, and action, if extracted from these reports, can be used by different groups for different purposes (e.g., emerging safety issue identification, quality control, supply chain, and diagnosis and prognosis). Considering the scale and variations of the data, it is impractical to manually sort through volumes of these reports and extract the parts, symptoms, and actions from these reports. Instead, a transfer learning based deep learning model can be trained to automatically extract this information from these reports. The model can learn the ontology and can therefore adapt to new emerging technologies (e.g., electric vehicles, and autonomous vehicles).

Figure 1:
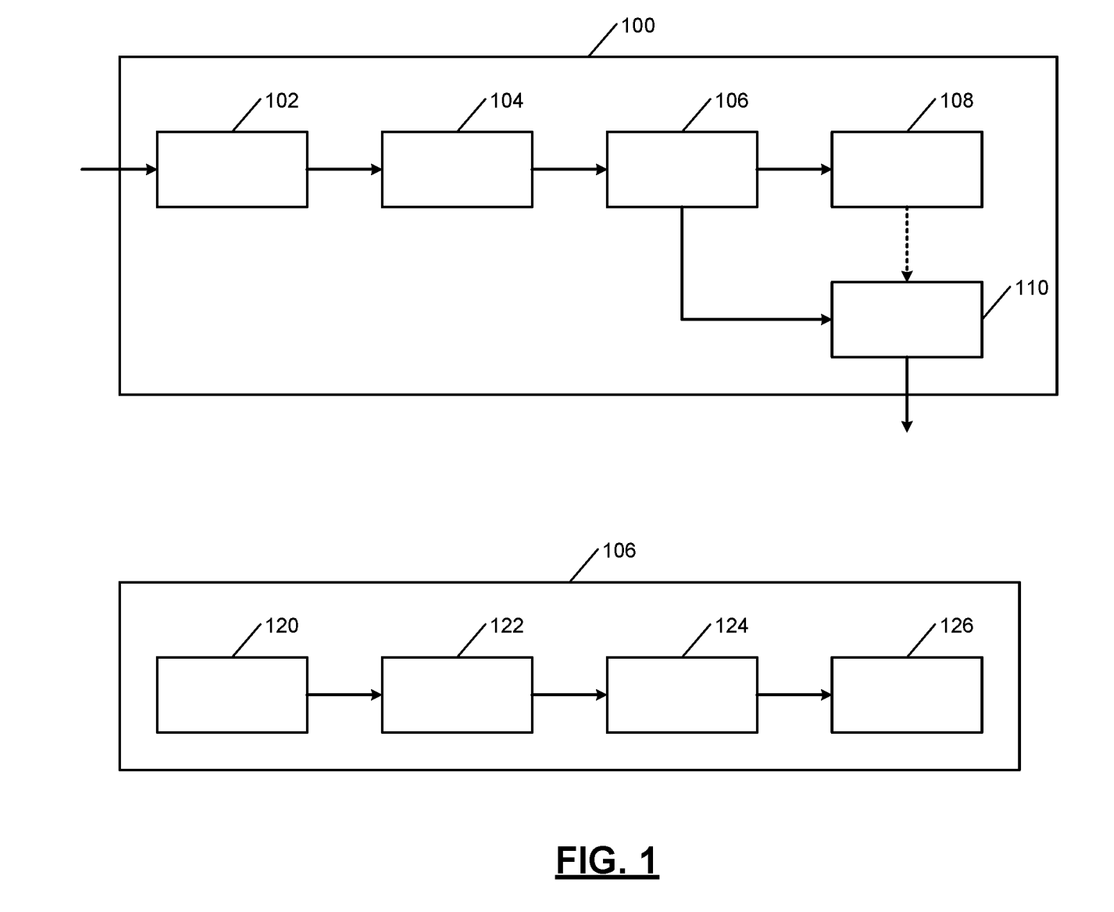
FIG. 1 shows a system for performing transfer leaning based deep learning based ontology extraction according to the present disclosure.

FIG. 1 provides an overview of a system 100 for performing transfer learning based deep learning ontology extraction according to the present disclosure. While the system is described throughout the present disclosure in the context of warranty data, which is used only as an illustrative example, the system has wide applicability in various other engineering and manufacturing industries (e.g., aerospace, heavy equipment manufacturing, mining). One or more components of the system 100 may be distributed in a cloud.

The system 100 comprises an input module 102, a cleaning module 104, an encoding module 106, a labeling module 108, and a classifier module 110. The system 100 is described below in detail. Briefly, the input module 102 receives service reports from dealerships. The cleaning module 104 cleans the data in the service reports. The encoding module 106 encodes the cleaned data and generates vectors. The labeling module 108, which is used during the training phase, generates labels the vectors using a ML model to train a transfer learning deep neural network in the classifier module 110 to classify vectors. The classifier module 110 includes the transfer learning deep neural network trained using the labeled vectors, which classifies vectors generated by the encoding module 106 during normal operation.

For example only, the input to the system 100 comprises numerous records of service reports received from dealerships around the world. The input module 102 receives these records containing the service reports. For example, these service reports may be received via the Internet or via an intranet maintained by the manufacturing company. The service reports, if not in English and in text form, are scanned and translated if necessary.

Different dealerships may use different terminology to describe similar issues. For example, one report may state "vehicle stalling, replaced ECM" while another report may describe the same issue as "vehicle stops abruptly, faulty control module" and so on. In addition to these differences, the text in the reports may have other inconsistencies such as misspellings, abbreviations, lack of spaces between words, too many spaces between words, lack of punctuation, etc. The cleaning module 104 cleans the text data in the reports to remove these inconsistencies.

In computational linguistics, an n-gram is a contiguous sequence of n items from a given sample of text or speech. The items can be phonemes, syllables, letters, words, or phrases depending on the application. The encoding module 106 comprises a parsing module 120, a part of speech (POS) module 122, a probability module 124, and a vector module 126. The encoding module 106 is described below in further detail. Briefly, the parsing module 120 collects n-grams from a text or speech corpus such as the cleaned text data output by the cleaning module 104. The POS module 122 assigns POS to the phrases in the n-grams. The probability module 124 generates distributed probabilities for the n-grams based on the POSs as explained below in detail. For each n-gram, the vector module 126 generates a multidimensional vector that includes the distributed probabilities and various other features that describe the n-gram. For example, the features include n-gram start portion, n-gram end position, start index, end index, length of verbatim, distribution probability (explained below), w2v, POS to vector, length of verbatim, term frequency, inverse document frequency, term frequency inverse document frequency, and so on.

The labeling module 108 labels the encoded data (i.e., the vectors). The labeling module 108 uses a hybrid approach to label the encoded data. A small number of manually labeled (and therefore high quality labeled) n-grams and their vectors are used to train a machine learning model such as a random forest model. Specifically, a label is assigned to each vector so that each word in the n-gram text, when detected in association with a label, can be classified as part, symptom, action, or other text (i.e., none of part, symptom, and action). The trained random forest model is tested for accuracy and corrected for any labeling errors.

Thereafter, the labeling module 108 uses the trained random forest model to automatically label large volumes of vectors received from the encoding module 106. The large volumes of labeled vectors from the labeling module 108 are then used to train the transfer learning deep neural network in the classifier module 110 as described below. The hybrid approach (i.e., initially using a small amount of high quality labeled data to train a ML model and then using the trained model to automatically label large volumes of training data) used by the labeling module 108 to produce a large volume of labeled training data is a significant improvement in the technical field of deep learning since typically large sets of training data are labeled manually to ensure accuracy in deep learning. In contrast, due to the hybrid approach, the labeling module 108 not only automatically produces large volumes of labeled training data but the labeled training data is also highly accurate. This greatly improves performance of deep learning models in real industrial set up, enabling their training at a scale to further improve model accuracy.

A transfer learning deep neural network used in the classifier module 110 is then trained, using as inputs the vectors and the associated labels generated by the labeling module 108, to operate as a four-class classifier. In use (i.e., during normal operation), the labeling module 108 is no longer used. When new reports are received by the input module 102, the cleaning module 104 cleans the text in the reports. The encoding module 106 encodes the cleaned text and generates vectors for n-grams in the cleaned text. The vectors are then input directly to train transfer learning deep neural network in the classifier module 110, which classifies (i.e., labels) the n-grams into one of four classes: part, symptom, action, or other text. The trained model with a satisfactory F1 score (see definition below) is saved in the classifier module 110 for learning new ontology or for augmenting an existing ontology from the raw input data (e.g., the service reports) and that can be utilized for a variety of purposes (e.g., quality control, safety analytics, etc.). New ontology can be learned from new raw data. An existing ontology can be augmented from the ontology that is learned from the raw data. An F1 score, also called the F score or F measure, is a measure of a test's accuracy. The F1 score is defined as the weighted harmonic mean of the test's precision and recall.

The encoding module 106 is now described in further detail. Notably, the encoding module 106 utilizes not only the size of the n-grams or the positions of the n-grams within the verbatim such as start and end positions (e.g., determined by the parsing module 120), but also utilizes context information and syntactic information of the n-grams within and across the verbatim. Further, in w2v, if a term (e.g., vehicle) appears in one position in one verbatim and in another position in another verbatim, the vector for the term is the same (i.e., static). That is, in w2v, irrespective of where in the verbatim the term appears, the term has the same vector. Therefore, in w2v, while the vector captures the context surrounding the term, the vector does not have adaptive context. Also, in w2v, the vectors rely on the surface terms (i.e., words as written) in the verbatim. Accordingly, in w2v, the vector would be empty when the input vocabulary or terminology changes due to changes in technology (e.g., from fossil fuel vehicles to alternative energy vehicles) or has not been observed historically.

In contrast, the encoding module 106 additionally utilizes part of speeches associated with the terms (e.g., determined by the POS module 122). The encoding module 106 converts the n-grams into their respective part of speeches. When a part of speech is associated with a particular part, symptom, or action of a certain size (e.g., a unigram, a bigram, trigram, or fourgram) in a verbatim of a certain length (e.g., determined by the parsing module 120), the encoding module 106 determines the surrounding words and their part of speeches. Accordingly, the encoding module 106 does not utilize the surface terms (i.e., words themselves) but utilizes their part of speeches based on their association with a part, symptom, or action and their position in a verbatim of a certain length.

Based on this information, the encoding module 106 builds a Bayesian probability model from the entire corpus. A distributional probability is estimated to build dynamic, adaptive context (e.g., by the probability module 124). For example, if a part of speech is a proper noun (NN) that is associated with a part (e.g., vehicle) that appears in a verbatim of a short length, then one term on the left hand side and one term on the right hand side of the proper noun and respective part of speeches of those neighboring terms are selected from all verbatims having the short length in which NN appears at the position where a part (e.g., vehicle) POS is observed, and a distributional probability is estimated. If the length of the verbatim is medium, two terms on either side are selected; and if the length of the verbatim is long, three terms on either side are selected.

Figure 5:
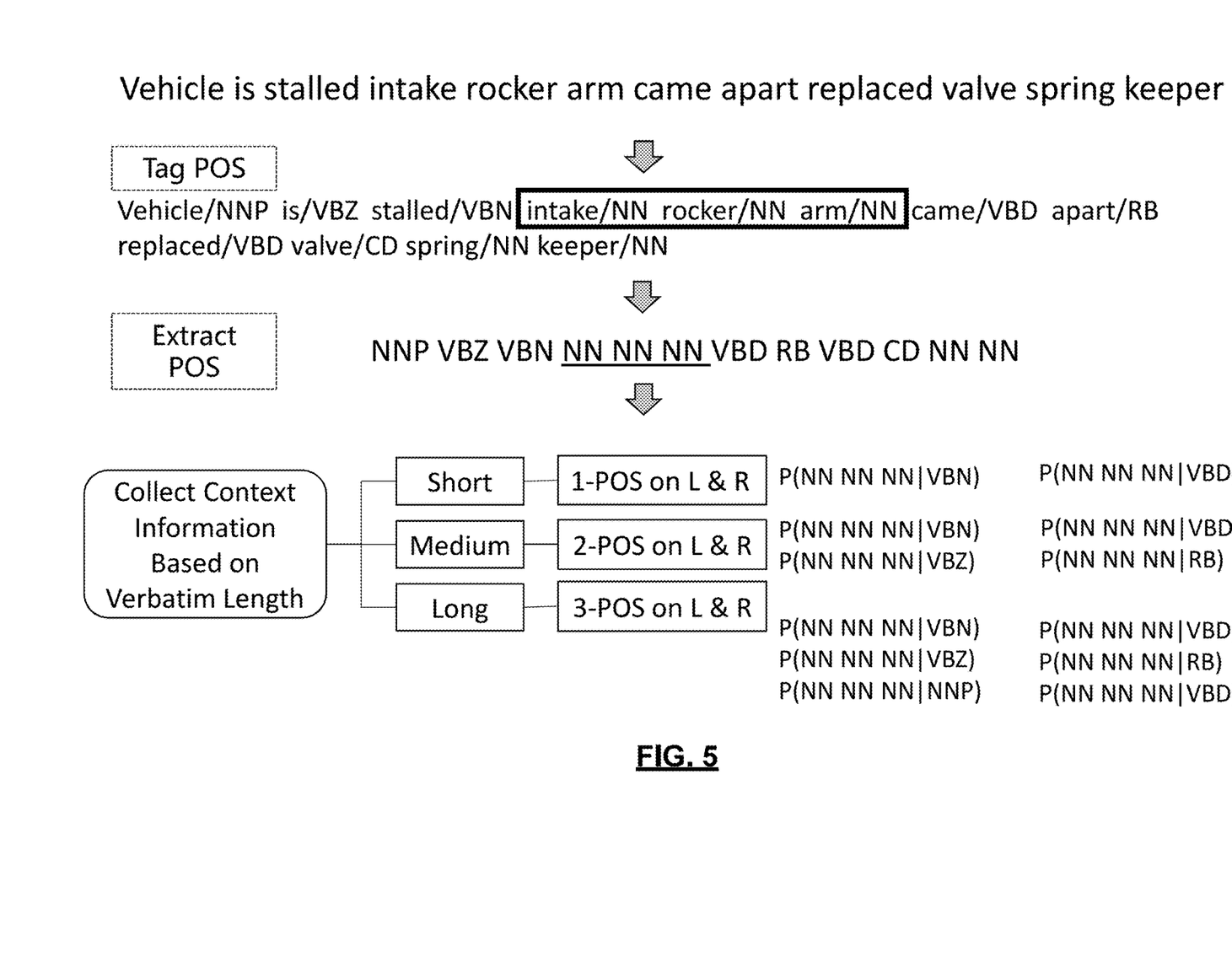
FIG. 5 shows a table showing examples of steps performed to encode an n-gram in a verbatim.

The following is an example of a processing scheme for generating conditional probabilities for an n-gram in a cleaned verbatim using the system 100 of FIG. 1. For example, suppose that the encoding module 106 receives the following cleaned verbatim from the cleaning module 104: "Vehicle is stalled intake rocker arm came apart replaced valve spring keeper". Examples of the steps performed by the encoding module 106 in the encoding process to encode an n-gram "intake rocker arm" in the above verbatim are shown and described with reference to Table 1 shown in FIG. 5.

The encoding module 106 parses the raw verbatim (e.g., using the parsing module 120), associates a part of speech (POS) with each portion of the raw verbatim (i.e., the POS module 122 tags n-gram tokens in verbatim with part of speeches), and extracts the POS assignments for the verbatim (e.g., using the probability module 124).

Examples of POS abbreviations used to denote various part of speeches are shown in Table 2 below. The system 100 of FIG. 1 can use any of these POSs to generate conditional probabilities for an n-gram in a cleaned verbatim using the processing scheme described below.

TABLE 2

| Number | Tag | Description |
| --- | --- | --- |
| 1. | CC | Coordinating conjunction |
| 2. | CD | Cardinal number |
| 3. | DT | Determiner |
| 4. | EX | Existential there |
| 5. | FW | Foreign word |
| 6. | IN | Preposition or subordinating conjunction |
| 7. | JJ | Adjective |
| 8. | JJR | Adjective, comparative |
| 9. | JJS | Adjective, superlative |
| 10. | LS | List item marker |
| 11. | MD | Modal |
| 12. | NN | Noun, singular or mass |
| 13. | NNS | Noun, plural |
| 14. | NNP | Proper noun, singular |
| 15. | NNPS | Proper noun, plural |
| 16. | PDT | Predeterminer |
| 17. | POS | Possessive ending |

TABLE 2-continued

| Number | Tag | Description |
|---|---|---|
| 18. | PRP | Personal pronoun |
| 19. | PRP$ | Possessive pronoun |
| 20. | RB | Adverb |
| 21. | RBR | Adverb, comparative |
| 22. | RBS | Adverb, superlative |
| 23. | RP | Particle |
| 24. | SYM | Symbol |
| 25. | TO | to |
| 26. | UH | Interjection |
| 27. | VB | Verb, base form |
| 28. | VBD | Verb, past tense |
| 29. | VBG | Verb, gerund or present participle |
| 30. | VBN | Verb, past participle |
| 31. | VBP | Verb, non-3rd person singular present |
| 32. | VBZ | Verb, 3rd person singular present |
| 33. | WDT | Wh-determiner |
| 34. | WP | Wh-pronoun |
| 35. | WP$ | Possessive wh-pronoun |
| 36. | WRB | Wh-adverb |

Note that w2v builds a vector for each word in the verbatim. Instead, the encoding module 106 uses the POS assignments in the verbatim and builds a vector based on the POS assignments in the verbatim as follows. This feature provides yet another improvement in the technical field of natural language processing as explained below.

For example, as shown in the above example, the encoding module 106 can build a vector for a selected token or phrase "intake rocker arm" (which is an n-gram with n=3) as follows (e.g., using the vector module 126). The part of speech (POS) associated with the token "intake rocker arm" is "NN NN NN". For the selected phrase and the selected verbatim, the encoding module 106 determines the length of the verbatim and the position where the selected n-gram token appears in the verbatim. The position is important because if the n-gram token occurs at a different position in the verbatim, it is possible that not only its own POS may change but also the POSs of its surrounding terms in the verbatim may also change. Thus, since the vector for the phrase is generated based on the position dependent POS of the phrase, the vector has adaptive context contrary to w2v, which is the same regardless of the position and is based solely on the words themselves and not on their POSs.

The encoding module 106 takes the POS of the phrase depending on its position in the verbatim and also determines the length of the verbatim. Depending on whether the length of the verbatim is short, medium, or long (the criteria can be predetermined), the encoding module 106 selects the POS of one, two, or three terms on each side (left and right) of the phrase. If the length of the verbatim is short, the POS of one term on the left hand side and one term on the right hand side of the phrase are selected. If the length of the verbatim is medium, two terms on either side are selected; and if the length of the verbatim is long, three terms on either side are selected.

The encoding module 106 then estimates Bayesian conditional probabilities of the POS of the selected phrase (e.g., using the probability module 124). For example, if the length of the verbatim is short, the probability module 124 iterates through each short verbatim in the corpus, and determines if the POS "NN NN NN" of the selected phrase is reported in each short verbatim at the same position, with the one selected POS on the left and right (VBN and VBD in the example). If the length of the verbatim is medium, the probability module 124 iterates through each medium verbatim in the corpus, and determines if the POS "NN NN NN" of the selected phrase is reported in each medium verbatim at the same position, with two selected POSs on the left and right (VBN VBZ on the left first and second positions, and VBD RB on the right first and second positions in the example). If the length of the verbatim is long, the probability module 124 iterates through each long verbatim in the corpus, and determines if the POS "NN NN NN" of the selected phrase is reported in each long verbatim at the same position, with three selected POSs on the left and right (VBN VBZ NNP on the left first, second, and third positions; and VBD RB VBD on the right first, second, and third positions in the example).

Thus, the probability module 124 determines the conditional probability for the POS of the selected phrase (i.e., the probability that the POS of the phrase appears at the particular position in a verbatim of a particular length) not at the verbatim level but at the corpus level. The probability is additionally conditioned upon having the particular POSs of one, two, or three terms on each side of the phrase, depending on the length of the verbatim (short, medium, or long).

Accordingly, the conditional probability is a likelihood of POS of an n-gram appearing at a particular position in a verbatim of a particular length, given the particular one, two, or three POSs on the left and right side of the n-gram. If the length of the verbatim is short, the probability is the likelihood of the POS of the phrase (NN NN NN in the example) appearing at a particular position in a short verbatim, given the one POS on the left and right (VBN and VBD in the example). If the length of the verbatim is medium, the conditional probability is the likelihood of the POS of the phrase (NN NN NN in the example) appearing at a particular position in a medium verbatim, given the two POSs on the left and right (VBN VBZ on the left first and second positions, and VBD RB on the right first and second positions in the example). If the length of the verbatim is long, the conditional probability is the likelihood of the POS of the phrase (NN NN NN in the example) appearing at a particular position in a long verbatim, given the three POSs on the left and right (VBN VBZ NNP on the left first, second, and third positions; and VBD RB VBD on the right first, second, and third positions in the example).

An example of the conditional probability is Bayes' probability. The encoding module 106 (e.g., the vector module 126) then encodes the conditional probabilities for the phrase into the vector for the phrase (i.e., included as a feature in the vector). The conditional probability feature of the vector generated by the encoding module 106 differentiates the POS- and position-based vector from the conventional word based w2v and is a significant improvement in the technical field of natural language processing. An example of calculating the Bayesian probability in case of a POS such as NN in a short verbatim with one term on left having a POS VBN is given by Eqs. (1) and (2). The calculations of other cases can be realized along the same lines.

$$p(NN \mid VBN) = \frac{p(VBN \mid NN) \times p(NN)}{p(VBN)} \quad (1)$$

$$p(NN \mid VBN) = \frac{p(VBN \mid NN) \times p(NN)}{p(VBN \mid NN)_{\cdot p(NN)} + p(VBN \mid \neg NN)_{\cdot p(\neg NN)}} \quad (2)$$

The labeling module 108 is now described in further detail. For each verbatim received from the cleaning module 104, the encoding module 106 splits the verbatim into n-grams (e.g., one-grams, two-gram, three-grams, and four-grams). For each n-gram, the encoding module 106 generates vectors as described above. To train the random forest model used by the labeling module 108, a limited number of the n-grams and associated vectors are initially labeled manually (e.g., whether the n-gram is a part, symptom, action, or non-technical information).

Once the random forest model is trained based on the limited number of manually labeled vectors to recognize a particular vector as a particular label (e.g., whether the vector represents a part, symptom, or action), the random forest model is tested using additional validation dataset comprising vectors for unlabeled n-grams. Errors may arise (e.g., the random forest model may mislabel a vector) since manual labeling, which is used to train the random forest model, can be inconsistent due to varying subjective judgments (e.g., one labeler may label an n-gram as a part when the n-gram is not a part, etc.). These labeling errors are corrected by verifying the labeling of the vectors performed by the random forest model until the random forest model can label the vectors with a predetermined F1 accuracy score, which is determined empirically for an application domain (e.g., F1=0.91).

Thereafter, the labeling module 108 uses the trained random forest model to label large volumes of cleaned data encoded by the encoding module 106. The encoding module 106 generates vectors for large volumes of cleaned data, and the labeling module 108 labels the vectors using the trained random forest model. The vectors generated by the encoding module 106 and the corresponding labels generated by the labeling module 108 are then used to train the transfer learning based deep neural network used in the classifier module 110. Notably, the labels used to train the transfer learning based deep neural network are not manually generated, which is conventional, but are automatically generated by the trained random forest model, which is a significant improvement in the technical field of natural language processing.

Once the transfer learning based deep neural network in the classifier module 110 is trained, the system 100 is ready for normal operation (i.e., production use). In use, the input module 102 receives new service report. The cleaning module 104 cleans the new reports. The encoding module 106 encodes the new cleaned data and generates new vectors including the conditional probabilities and other features described above. The labeling module 108 is no longer used. The vectors generated by the encoding module 106 are input to the trained neural network in the classifier module 110. The transfer learning based deep neural network classifies (i.e., labels) the vectors.

In transfer learning based deep neural network classifier, a two staged approach is used. Initially, the entire network (i.e., all the layers of the network) is trained by using a large quantity of labelled dataset generated by the random forest model. During transfer learning phase, the lower layers of the networks are frozen (i.e., the algorithm does not update the weights of neurons associated with lower layers) and then only high quality, but low quantity manually labelled dataset is used to train the top layers of the network. This approach is particularly crucial to take an advantage when high quantity data is available (but in some cases is not directly related to the application domain) for training the model but with relatively low F1 score. Then the high-quality data can further improve the F1 score by retraining top layers. In real-world data, the transfer learning approach significantly improves the F1 score.

Figure 2:
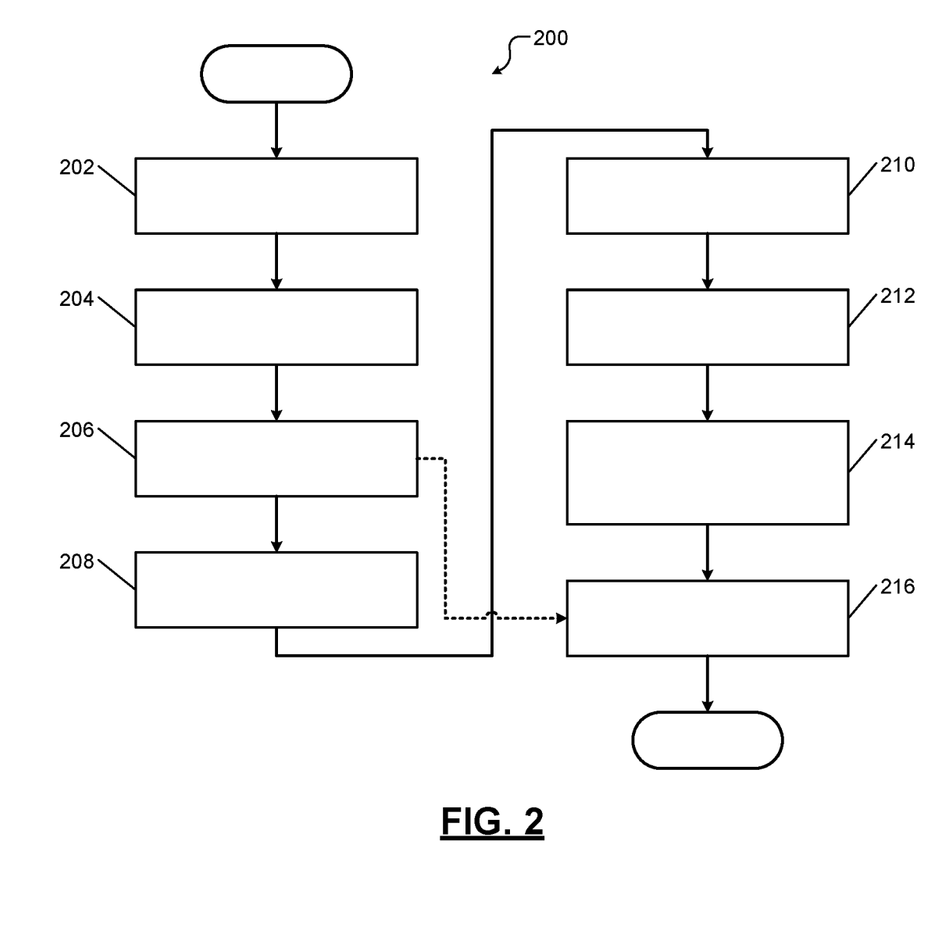
FIG. 2 shows a flowchart of a method for performing deep learning based ontology extraction using the system of FIG. 1.
Figure 3:
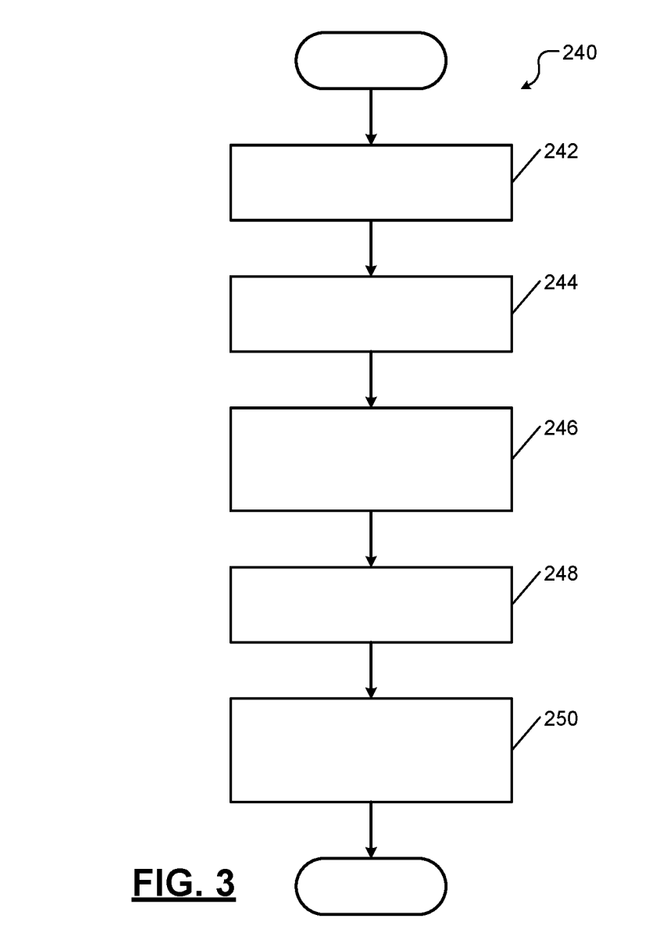
FIG. 3 shows a flowchart of a method for generating a vector using the system of FIG. 1.
Figure 4:
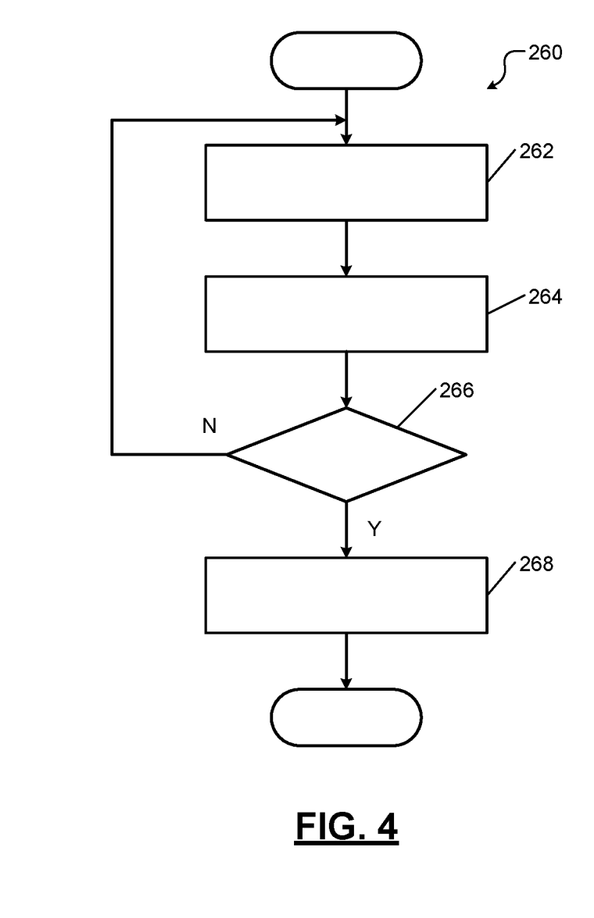
FIG. 4 shows a flowchart of a method for training a machine learning model to automatically generate large amounts of labeled training data to train a classifier such as a deep learning neural network using the system of FIG. 1.

FIGS. 2-4 show flowcharts of methods performed by the system 100. FIG. 2 shows the overall method performed by the system 100. FIG. 3 shows the method performed by the encoding module 106 to generate vectors in further detail. FIG. 4 shows the hybrid approach used by the labeling module 108 to automatically generate large amounts of training data to train the classifier in further detail. In the following description, the term control is used to denote operations performed by one or more modules of the system 100. Since these methods and operations of the modules of the system 100 are already described above in detail, the following description is kept brief for brevity.

FIG. 2 shows a method 200 for deep learning based ontology extraction according to the present disclosure. At 202, control receives raw data (e.g., service reports for vehicles) from various sources. At 204, control cleans the raw data. At 206, control generates vectors based on part of speeches and conditional probabilities of n-grams in the cleaned data (shown in detail in the method of FIG. 3).

At 208, some of the vectors are manually labeled. At 210, control trains a ML model (e.g., a random forest model) using the manually labeled vectors. At 212, after testing and correcting the trained ML model using the method shown in FIG. 4, control automatically labels large volumes of vectors (generated based on large volumes of cleaned raw data) using the trained ML model.

At 214, control trains a classifier (e.g., a deep learning neural network) using the large volumes of vectors automatically labeled by the trained ML model. At 216, control classifies vectors from new raw data, after cleaning and generating vectors at 204, 206, using the trained classifier.

FIG. 3 shows a method 240 for generating vectors at 206 in the method 200. At 242, control parses a cleaned verbatim into n-grams. At 244, control determines positions and POSs of the n-grams, and the length of the verbatim. At 246, control generates conditional probabilities for the n-grams based on their positions, POSs, and POSs of surrounding terms depending on the length of the verbatim. At 248, control determined additional features (e.g., start and end positions of the n-grams, start and end indexes of the n-grams, w2v, etc.). At 250, control generates a vector for each n-gram including its conditional probabilities and the additional features.

FIG. 4 shows a method 260 for labeling large volumes of training data using the hybrid approach according to the present disclosure. At 262, control trains the ML model (e.g., random forest model) using a limited number of vectors and corresponding manual labels. At 264, control labels vectors using the trained ML model. At 266, control determines if the ML model labeled the vectors with a predetermined accuracy (i.e., if the ML model is trained). Control returns to 262 (i.e., continues to train the ML model) if the ML model did not label the vectors with a predetermined accuracy. If the ML model labeled the vectors with a predetermined accuracy (i.e., if the ML model is trained), control proceeds to 268. At 268, control uses the trained ML model to automatically label large volumes of training data to train a classifier (e.g., a deep learning neural network).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a processor; and a memory storing instructions which when executed by the processor configure the processor to:

process unstructured data to identify a plurality of subsets of text in a set of text in the unstructured data;

determine, for a subset from the plurality of subsets, probabilities based on a position of the subset in the set of text, a part of speech (POS) of each word in the subset, and POSs of one or more words on left and right hand sides of the subset, a number of the one or more words being selected based on a length of the set of text;

generate a feature vector for the subset, the feature vector including the probabilities and additional features of the subset;

encode the probabilities for the subset into the feature vector for the subset and include the encoded probabilities as a feature in the feature vector;

classify, using a classifier, the subset into one of a plurality of classes based on the feature vector for the subset, the plurality of classes representing an ontology of a domain of knowledge; and perform natural language processing (NLP) of the unstructured data using the encoded probabilities and the classifier including a transfer learning based classifier that uses context information, position features, syntactic information, and a distributional probability model based on POSs to extract and classify concepts from the unstructured data;

wherein the processor is configured to:

train a model using manually labeled first set of feature vectors generated from the unstructured data; and automatically label second set of feature vectors generated from the unstructured data using the trained model, wherein the second set of feature vectors is larger than the first set of feature vectors by one or more orders of magnitude; and wherein the processor is configured to:

train the transfer learning based classifier using the larger automatically labeled second set of feature vectors to train low level layers of the transfer learning based classifier and then utilizing the manually labeled first set of feature vectors having a higher quality but smaller quantity than the larger automatically labeled second set of vectors to retrain top level layers of the transfer learning based classifier to improve a score of the transfer learning based classifier with which to classify feature vectors representing additional unstructured data into the plurality of classes.

2. The system of claim 1 wherein the model includes a random forest based model and wherein the classifier includes a transfer learning based deep neural network.

3. The system of claim 1 wherein the probabilities include Bayes' probabilities of finding the subset at a predetermined position in sets of text of a predetermined length in the unstructured data with the POSs of the one or more words on the left- and right-hand sides of the subset.

4. The system of claim 1 wherein the additional features of the feature vector include start and stop positions of the subset in the set of text, the length of the set of text, and word2vec for each word in the subset.

5. The system of claim 1 wherein the processor is configured to:

determine the length of the set of text; and assign POSs to each word in the set of text.

6. The system of claim 1 wherein the processing of the unstructured data includes cleaning the unstructured data by one or more of removing extra spaces, adding spaces between words, splitting incorrectly joined words, joining incorrectly split words, and correcting spelling.

7. The system of claim 1 wherein:

the unstructured data includes vehicle service reports received from dealerships; and the plurality of classes includes parts, symptoms, actions, and other non-technical data.

8. The system of claim 7 wherein the processor is configured to:

process portions of data classified by the classifier; and assess, based on the processing of the portions of data classified by the classifier, quality of at least one of manufacturing vehicles, servicing vehicles, and parts used in vehicles.

9. The system of claim 1 wherein the processor is configured to:

determine one of the probabilities for one of the POSs of a selected phrase at corpus level and not at verbatim level, wherein each of the probabilities is a probability that a POS of a phrase appears at a particular position in a verbatim of a particular length; and condition the probability upon having particular POSs of one, two, or three terms on each side of the phrase, depending on a length of the verbatim.

10. The system of claim 9 wherein the conditional probability is a likelihood of a POS of an n-gram appearing at a particular position in a verbatim of a particular length, given the particular one, two, or three POSs on the left and right sides of the n-gram.

11. A method comprising:

processing unstructured data to identify a plurality of subsets of text in a set of text in the unstructured data;

determining, for a subset from the plurality of subsets, probabilities based on a position of the subset in the set of text, a part of speech (POS) of each word in the subset, and POSs of one or more words on left and right hand sides of the subset, a number of the one or more words being selected based on a length of the set of text;

generating a feature vector for the subset, the feature vector including the probabilities and additional features of the subset;

encoding the probabilities for the subset into the feature vector for the subset and including the encoded probabilities as a feature in the feature vector;

classifying, using a classifier, the subset into one of a plurality of classes based on the feature vector for the subset, the plurality of classes representing an ontology of a domain of knowledge; and performing natural language processing (NLP) of the unstructured data using the encoded probabilities and the classifier including a transfer learning based classifier that uses context information, position features, syntactic information, and a distributional probability model based on POSs to extract and classify concepts from the unstructured data the method further comprising:

training a model using manually labeled first set of feature vectors generated from the unstructured data; and automatically labeling second set of feature vectors generated from the unstructured data using the trained model, wherein the second set of feature vectors is larger than the first set of feature vectors by one or more orders of magnitude; and the method further comprising:

training the classifier using the automatically labeled second set of feature vectors to initially train low level layers of the classifier and then utilizing the manually labelled first set of feature vectors having a higher quality than the automatically labeled second set of feature vectors to train high level layers of the classifier to classify feature vectors representing additional unstructured data into the plurality of classes.

12. The method of claim 11 wherein the model includes a random forest based model and wherein the classifier includes a deep neural network.

13. The method of claim 11 wherein the probabilities include Bayes' probabilities of finding the subset at a predetermined position in sets of text of a predetermined length in the unstructured data with the POSs of the one or more words on the left and right hand sides of the subset.

14. The method of claim 11 wherein the additional features of the feature vector include start and stop positions of the subset in the set of text, the length of the set of text, and word2vec for each word in the subset.

15. The method of claim 11 further comprising:
determining the length of the set of text; and
assigning POSs to each word in the set of text.

16. The method of claim 11 wherein the processing of the unstructured data includes cleaning the unstructured data by one or more of removing extra spaces, adding spaces between words, splitting incorrectly joined words, joining incorrectly split words, and correcting spelling.

17. The method of claim 11 wherein:
the unstructured data includes vehicle service reports received from dealerships; and
the plurality of classes includes parts, symptoms, actions, and other non-technical data.

18. The method of claim 17 further comprising:
processing portions of data classified by the classifier; and
assessing, based on the processing of the portions of data classified by the classifier, quality of at least one of manufacturing vehicles, servicing vehicles, and parts used in vehicles.

19. The method of claim 11 further comprising:
determining one of the probabilities for one of the POSs of a selected phrase at corpus level and not at verbatim level, wherein each of the probabilities is a probability that a POS of a phrase appears at a particular position in a verbatim of a particular length; and
conditioning the probability upon having particular POSs of one, two, or three terms on each side of the phrase, depending on a length of the verbatim.

20. The method of claim 19 wherein the conditional probability is a likelihood of a POS of an n-gram appearing at a particular position in a verbatim of a particular length, given the particular one, two, or three POSs on the left and right sides of the n-gram.

\* \* \* \* \*